US012565218B2

(12) United States Patent
Tsuji et al.

(10) Patent No.: US 12,565,218 B2
(45) Date of Patent: Mar. 3, 2026

(54) VEHICLE CONTROL APPARATUS

(71) Applicant: HONDA MOTOR CO., LTD., Tokyo (JP)

(72) Inventors: Kanta Tsuji, Saitama (JP); Yoshifumi Nakamura, Saitama (JP); Ayumu Horiba, Saitama (JP); Akihiko Aoyagi, Tokyo (JP); Yuichi Komori, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 321 days.

(21) Appl. No.: 17/583,777

(22) Filed: Jan. 25, 2022

(65) Prior Publication Data

US 2022/0234599 A1 Jul. 28, 2022

(30) Foreign Application Priority Data

Jan. 27, 2021 (JP) ................................. 2021-011529

(51) Int. Cl.
B60W 50/00 (2006.01)
B60W 10/04 (2006.01)
(Continued)

(52) U.S. Cl.
CPC ........ B60W 50/0098 (2013.01); B60W 10/04 (2013.01); B60W 10/18 (2013.01);
(Continued)

(58) Field of Classification Search
CPC .. B60W 50/0098; B60W 10/04; B60W 10/18; B60W 10/20; B60W 30/12;
(Continued)

(56) References Cited

U.S. PATENT DOCUMENTS

2017/0205823 A1* 7/2017 Arndt ................ B60W 60/0057
2018/0173227 A1* 6/2018 Mukai ................ B60W 50/082
(Continued)

FOREIGN PATENT DOCUMENTS

JP 2019079217 A * 5/2019
JP 2019172180 A * 10/2019
(Continued)

OTHER PUBLICATIONS

Nov. 8, 2022, Japanese Office Action issued for related JP Application No. 2021-011529.

*Primary Examiner* — Helal A Algahaim
*Assistant Examiner* — Ashleigh Nicole Turnbaugh
(74) *Attorney, Agent, or Firm* — Paratus Law Group, PLLC

(57) ABSTRACT

A vehicle control apparatus includes a recognition unit configured to recognize a surrounding situation of a host vehicle, a driving control unit configured to control at least one of acceleration and deceleration and steering of the host vehicle based on a recognition result of the recognition unit and to perform driving control of the host vehicle, and a driving request unit configured to execute a driving change request or a driving operation request based on the surrounding situation during execution of the driving control. The driving request unit is configured to output a first request and a second request different from the first request. The driving request unit comprises a first mode in which the first request is output, and the second request is output when the first request is not satisfied, and a second mode in which the second request is output without outputting the first request.

17 Claims, 8 Drawing Sheets

(51) Int. Cl.

| | |
|---|---|
| *B60W 10/18* | (2012.01) |
| *B60W 10/20* | (2006.01) |
| *B60W 30/12* | (2020.01) |
| *B60W 50/02* | (2012.01) |
| *B60W 60/00* | (2020.01) |

(52) U.S. Cl.
CPC ............ *B60W 10/20* (2013.01); *B60W 30/12* (2013.01); *B60W 50/0205* (2013.01); *B60W 60/0053* (2020.02); *B60W 2050/0215* (2013.01); *B60W 2554/4041* (2020.02); *B60W 2554/4042* (2020.02); *B60W 2554/802* (2020.02); *B60W 2556/40* (2020.02); *B60W 2710/18* (2013.01); *B60W 2710/20* (2013.01); *B60W 2720/106* (2013.01); *B60W 2720/125* (2013.01)

(58) Field of Classification Search
CPC ......... B60W 50/0205; B60W 60/0053; B60W 2050/0215; B60W 2554/4041; B60W 2554/4042; B60W 2554/802; B60W 2556/40; B60W 2710/18; B60W 2710/20; B60W 2720/106; B60W 2720/125
USPC .......................................................... 701/26
See application file for complete search history.

(56) References Cited

U.S. PATENT DOCUMENTS

| | | | | |
|---|---|---|---|---|
| 2020/0013242 A1* | 1/2020 | Hamada | .................... | G08G 1/16 |
| 2020/0207355 A1 | 7/2020 | Ishioka et al. | | |
| 2021/0380145 A1* | 12/2021 | Yoo | ................... | B60W 60/0053 |
| 2022/0258771 A1* | 8/2022 | Chung | ................. | B60W 50/14 |
| 2022/0340166 A1* | 10/2022 | Kume | ............. | B60W 30/18163 |
| 2023/0054024 A1* | 2/2023 | Oba | ......................... | A61B 5/18 |

FOREIGN PATENT DOCUMENTS

| | | |
|---|---|---|
| JP | 2020-080167 A | 5/2020 |
| JP | 2020-104634 A | 7/2020 |

* cited by examiner

Figure 3:
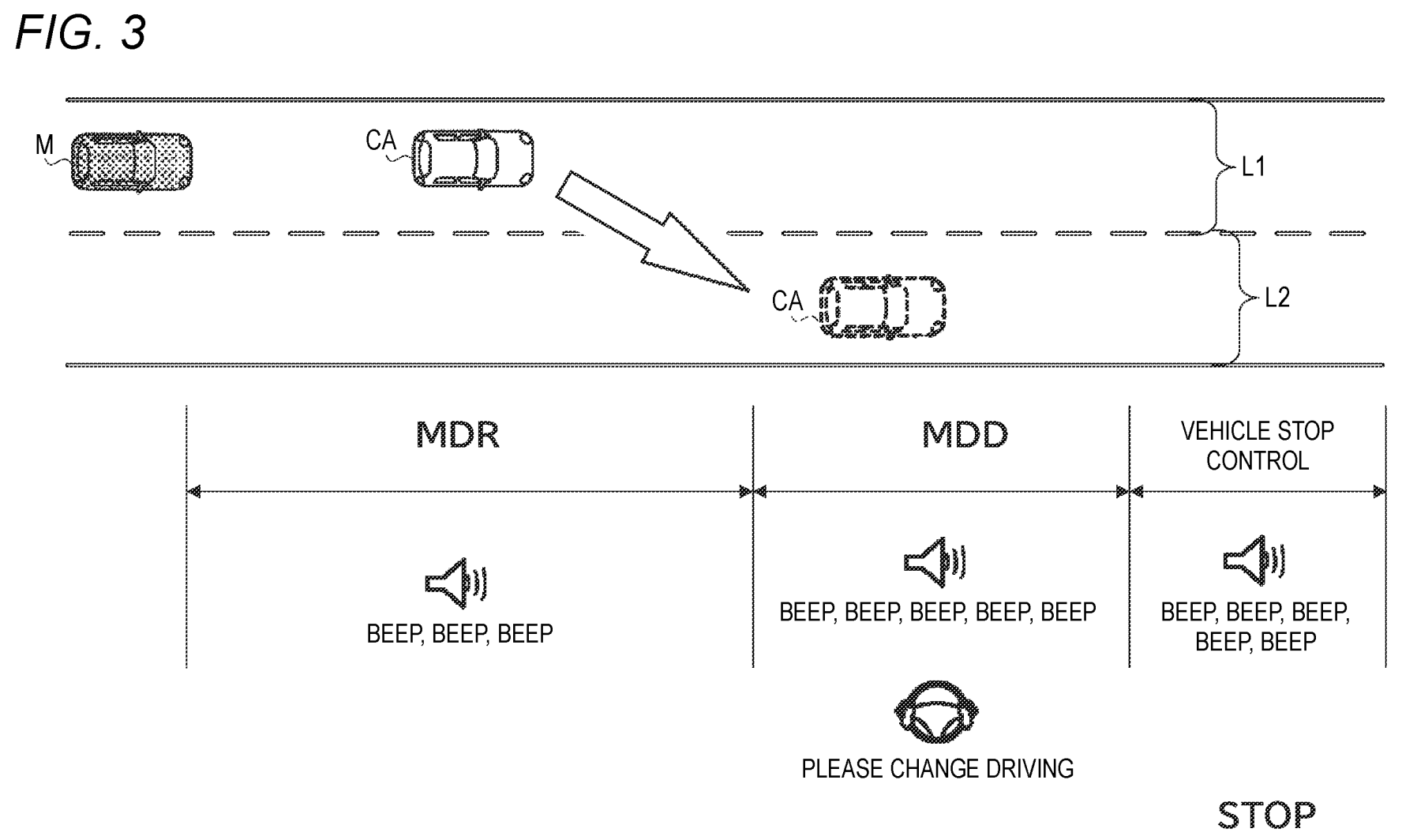

MDR

BEEP, BEEP, BEEP

MDD

BEEP, BEEP, BEEP, BEEP

PLEASE CHANGE DRIVING

VEHICLE STOP
CONTROL

BEEP, BEEP, BEEP,
BEEP, BEEP

STOP

*FIG. 7*

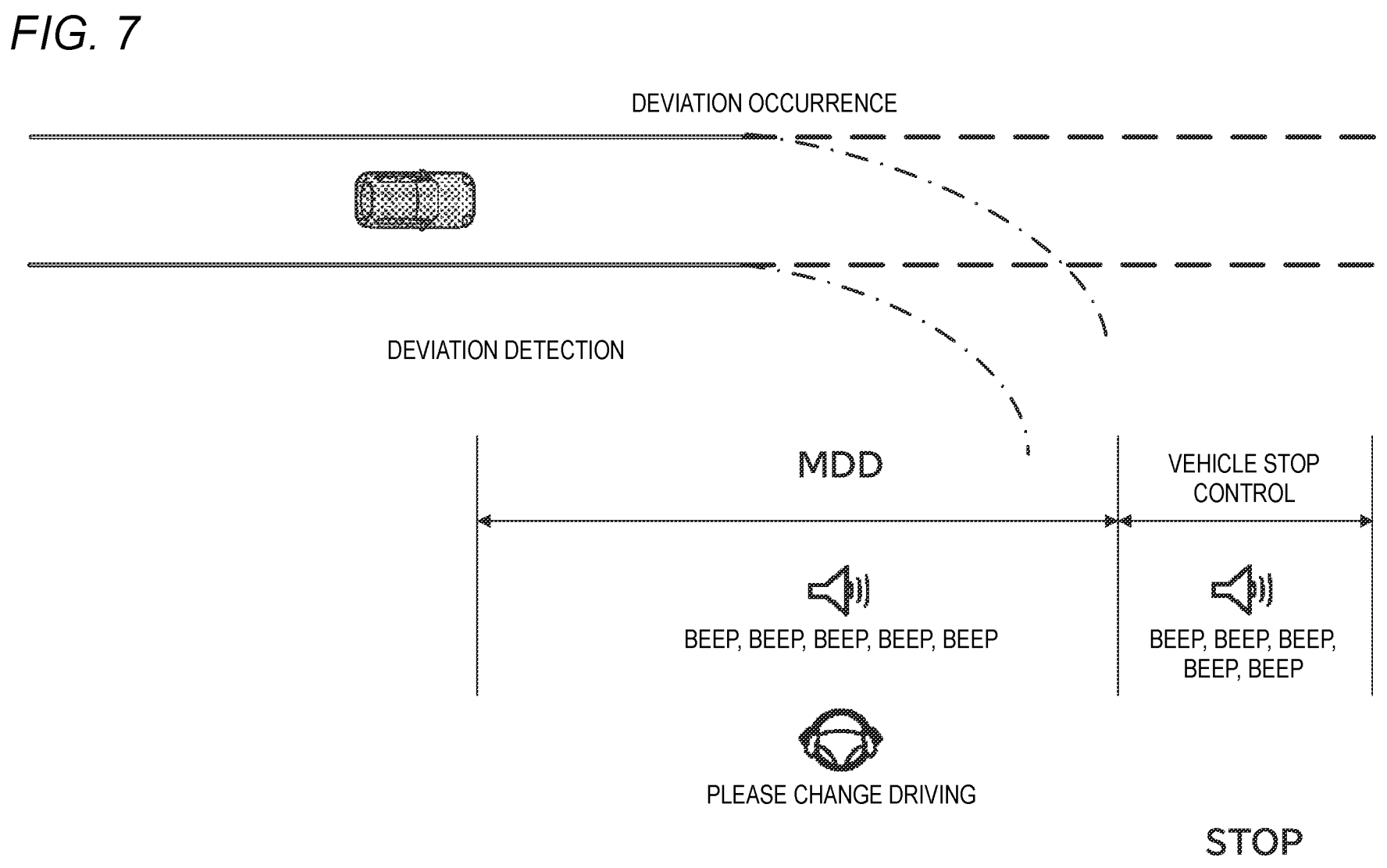

DEVIATION OCCURRENCE

DEVIATION DETECTION

VEHICLE STOP CONTROL

MDD

BEEP, BEEP, BEEP, BEEP, BEEP

BEEP, BEEP, BEEP, BEEP, BEEP

STOP

PLEASE CHANGE DRIVING

VEHICLE CONTROL APPARATUS

CROSS-REFERENCE TO RELATED APPLICATION

The present application claims priority from Japanese Patent Application No. 2021-011529 filed on Jan. 27, 2021, the entire content of which is incorporated herein by reference.

TECHNICAL FIELD

The present invention relates to a vehicle control apparatus that performs driving control by controlling at least one of acceleration and deceleration and steering of a vehicle.

BACKGROUND ART

In recent years, a vehicle having a driving assistance function of controlling at least one of acceleration and deceleration and steering of the vehicle under monitoring by a driver and a vehicle having an automatic driving function of controlling acceleration and deceleration and steering of the vehicle under monitoring by a system have been developed. In these vehicles in which driving control is performed, when the driving control cannot be continued due to a change in a surrounding environment, a driver is requested to change driving.

For example, JP-A-2020-104634 discloses that, in lane change assistance control from a merging lane to a main lane, a hands-on request for requesting a driver to grip a steering wheel is issued, and when the driver does not respond to the hands-on request, the driver is requested to change driving.

In this way, a proposal for prompting the driver to perform a driving operation or a driving change by outputting two different requests in a stepwise manner during the driving control has been made, but when urgency is high, it is assumed that the driving operation or the driving change is required quickly.

SUMMARY

The present invention provides a vehicle control apparatus that can appropriately request a driver to perform a driving operation or a driving change.

According to an aspect of the present invention, there is provided a vehicle control apparatus includes a recognition unit configured to recognize a surrounding situation of a host vehicle, a driving control unit configured to control at least one of acceleration and deceleration and steering of the host vehicle based on a recognition result of the recognition unit and to perform driving control of the host vehicle, and a driving request unit configured to execute a driving change request or a driving operation request based on the surrounding situation during execution of the driving control. The driving request unit is configured to output a first request and a second request different from the first request. The driving request unit comprises a first mode in which the first request is output, and the second request is output when the first request is not satisfied, and a second mode in which the second request is output without outputting the first request.

According to the present invention, when urgency is not high, it is possible to sequentially output two different requests to prompt a driving operation, and when the urgency is high, it is possible to output only a second request to prompt a quick driving operation.

BRIEF DESCRIPTION OF DRAWINGS

FIG. 3 is a diagram showing an example of a situation in which a driving request processing in a first mode is performed.

FIG. 7 is a diagram showing another example of a situation in which the driving request processing in the second mode is performed.

DESCRIPTION OF EMBODIMENTS

Hereinafter, a vehicle control apparatus according to an embodiment of the present invention will be described with reference to the drawings.

[Overall Configuration]

Figure 1:
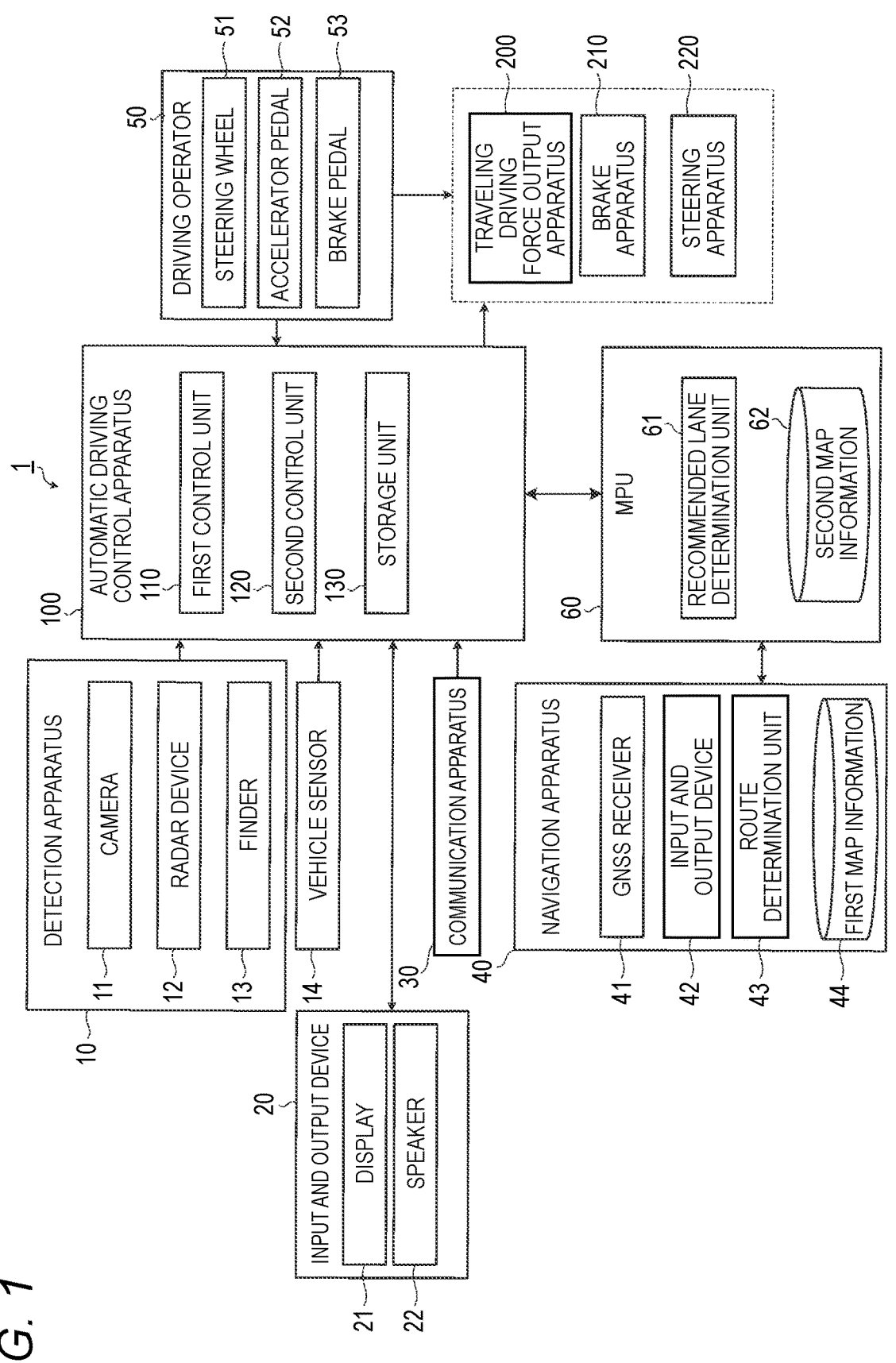
FIG. 1 is a configuration diagram of a vehicle system 1 that uses an automatic driving control apparatus 100 according to an embodiment of the present invention.

FIG. 1 is a configuration diagram of a vehicle system 1 using the vehicle control apparatus. A vehicle on which the vehicle system 1 is mounted is, for example, a vehicle such as a two-wheeled vehicle, a three-wheeled vehicle, or a four-wheeled vehicle, and a driving source of the vehicle is an internal combustion engine such as a diesel engine or a gasoline engine, an electric motor, or a combination thereof. The electric motor operates using electric power generated by a generator connected to the internal combustion engine or electric power discharged from a secondary battery or a fuel cell.

The vehicle system 1 includes, for example, a detection apparatus 10, a vehicle sensor 14, an input and output device 20, a communication apparatus 30, a navigation apparatus 40, a map positioning unit (MPU) 60, a driving operator 50, an automatic driving control apparatus 100, a traveling driving force output apparatus 200, a brake apparatus 210, and a steering apparatus 220. These apparatuses and devices are connected to one another by a multiplex communication line such as a controller area network (CAN) communication line, a serial communication line, a wireless communication network, or the like. The configuration shown in FIG. 1 is merely an example, and a part of the configuration may be omitted or another configuration may be added.

The detection apparatus 10 includes, for example, a camera 11, a radar device 12, and a finder 13.

The camera 11 is, for example, a digital camera that uses a solid-state image-capturing element such as a charge coupled device (CCD) or a complementary metal oxide semiconductor (CMOS), and outputs image data obtained by performing photographing to the automatic driving control apparatus 100. The camera 11 is attached to an optional place of a vehicle (hereinafter, referred to as a host vehicle M) on which the vehicle system 1 is mounted. When capturing an image of a front, the camera 11 is attached to an upper portion of a front windshield, a rear surface of a rear-view mirror, or the like. When capturing an image of a rear, the camera 11 is attached to an upper portion of a rear windshield or the like. For example, the camera 11 repeatedly captures images of a vicinity of the host vehicle M periodically. The camera 1 may be a stereo camera.

The radar device 12 radiates radio waves such as millimeter waves to a vicinity of the host vehicle M, detects radio waves (reflected waves) reflected by an object to detect at least a position (a distance and an orientation) of the object, and outputs a detection result thereof to the automatic driving control apparatus 100. The radar device 12 is attached to an optional place of the host vehicle M. The radar device 12 may detect a position and a speed of the object by a frequency modulated continuous wave (FM-CW) method.

The finder 13 is a light detection and ranging (LIDAR). The finder 13 emits light to the vicinity of the host vehicle M, measures scattered light, and outputs a measurement result thereof to the automatic driving control apparatus 100. The finder 13 detects a distance to a target based on a time from light emission to light reception. The emitted light is, for example, pulsed laser light. The finder 13 is attached to an optional place of the host vehicle M.

The vehicle sensor 14 includes a vehicle speed sensor that detects a speed of the host vehicle M, an acceleration sensor that detects an acceleration, a yaw rate sensor that detects an angular speed around a vertical axis, an orientation sensor that detects a direction of the host vehicle M. and the like.

The communication apparatus 30 communicates with other vehicles present in the vicinity of the host vehicle M by using, for example, a cellular network, a Wi-Fi network, a Bluetooth (registered trademark), dedicated short range communication (DSRC), or the like, or communicates with various server apparatuses via a wireless base station.

The input and output device 20 presents various pieces of information to an occupant of the host vehicle M and receives an input operation by the occupant. The input and output device 20 includes a display 21 and a speaker 22. Further, the input and output device 20 may include various display devices, a buzzer, a touch panel, a switch, a key, and the like. The display 21 and the speaker 22 output a display and a sound. The display and the sound include a display and a voice for notifying the occupant of the host vehicle M of a driving request.

The navigation apparatus 40 includes, for example, a global navigation satellite system (GNSS) receiver 41, an input and output device 42, and a route determination unit 43. The navigation apparatus 40 stores first map information 44 in a storage device such as a hard disk drive (HDD) or a flash memory. The GNSS receiver 41 identifies a position of the host vehicle M based on a signal received from a GNSS satellite. A position of the host vehicle M may be identified or complemented by an inertial navigation system (INS) that uses an output of the vehicle sensor 14. The input and output device 42 includes a display device, a speaker, a touch panel, and a key, and the like. A part or all of the input and output device 42 may be shared with the input and output device 20 described above. For example, the route determination unit 43 determines a route (hereinafter, referred to as on-map route) from a position of the host vehicle M identified by the GNSS receiver 41 (or an input optional position) to a destination input by the occupant by using the input and output device 42 with reference to the first map information 44. The first map information 44 is, for example, information in which a road shape is represented by a link indicating a road and nodes connected by the link. The first map information 44 may include a curvature of a road, point of interest (PO) information, and the like. The on-map route is output to the MPU 60. The navigation apparatus 40 may perform route guidance that uses the input and output device 42 based on the on-map route. The navigation apparatus 40 may be implemented by, for example, a function of a terminal apparatus such as a smartphone or a tablet terminal possessed by the occupant. The navigation apparatus 40 may transmit a current position and a destination to a navigation server via the communication apparatus 30 and acquire a route equivalent to the on-map route from the navigation server.

The MPU 60 includes, for example, a recommended lane determination unit 61, and stores second map information 62 in a storage device such as an HDD or a flash memory. The recommended lane determination unit 61 divides the on-map route provided from the navigation apparatus 40 into a plurality of blocks (for example, divides the on-map route every 100 [m] in a vehicle traveling direction), and determines a recommended lane for each block with reference to the second map information 62. The recommended lane determination unit 61 determines which lane from a left side the vehicle travels in. When there is a branching place on the on-map route, the recommended lane determination unit 61 determines a recommended lane such that the host vehicle M can travel on a reasonable route for travelling to a branch destination.

The second map information 62 is map information with higher accuracy than the first map information 44. The second map information 62 includes, for example, information on a center of a lane, information on a boundary of the lane, or the like. Further, the second map information 62 may include road information, traffic regulation information, address information (address and postal code), facility information, telephone number information, and the like. The second map information 62 may be updated as needed by the communication apparatus 30 communicating with another apparatus.

The driving operator 50 includes a steering wheel 51, an accelerator pedal 52, and a brake pedal 53. Further, the driving operator 50 may include, for example, a shift lever, an irregularly shaped steering wheel, a joystick, a winker lever, a microphone, various switches, and the like. A sensor that detects an operation amount or presence or absence of an operation is attached to the driving operator 50, and a detection result thereof is output to the automatic driving control apparatus 100 or some or all of the traveling driving force output apparatus 200, the brake apparatus 210, and the steering apparatus 220.

The automatic driving control apparatus 100 includes, for example, a first control unit 110, a second control unit 120, and a storage unit 130. Each of the first control unit 110 and the second control unit 120 is implemented by, for example, a hardware processor such as a central processing unit (CPU) executing a program (software). Further, some or all of these components may be implemented by hardware (including circuitry) such as large scale integration (LSI), an application specific integrated circuit (ASIC), a field-programmable gate array (FPGA), or a graphics processing unit (GPU), or may be implemented by cooperation of software and the hardware. The program may be stored in a storage device such as an HDD or a flash memory of the storage unit 130 in advance, may be stored in a detachable storage medium such as a DVD or a CD-ROM, or may be installed in an HDD or a flash memory of the automatic driving control apparatus 100 by mounting the storage medium on a drive device.

Figure 2:
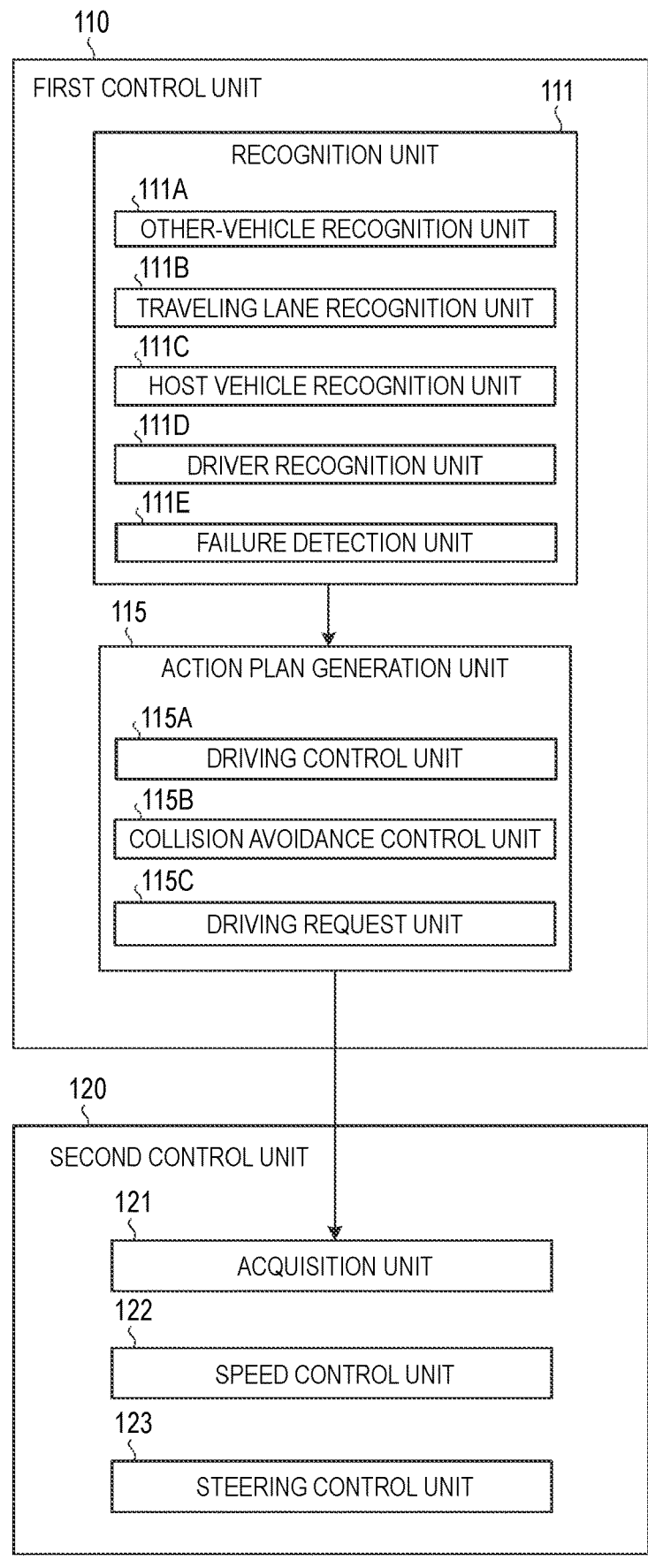
FIG. 2 is a functional configuration diagram of a first control unit 110 and a second control unit 120.

FIG. 2 is a functional configuration diagram of the first control unit 110 and the second control unit 120. The first control unit 110 includes, for example, a recognition unit 111 and an action plan generation unit 115. The first control unit 110 implements, for example, a function based on artificial intelligence (AI) and a function based on a model given in advance in parallel. For example, a function of "recognizing an intersection" may be implemented by executing recognition of the intersection based on deep learning or the like and recognition based on a condition given in advance (there is a signal, a road sign, or the like that can be subjected to pattern matching) in parallel, scoring both of them, and comprehensively evaluating them. Accordingly, reliability of automatic driving is ensured.

The recognition unit 111 recognizes states such as a position, a speed, and an acceleration of an object around the host vehicle M based on information input from the detection apparatus 10. The position of the object is recognized as, for example, a position on absolute coordinates with a representative point (a center of gravity, a driving shaft center, or the like) of the host vehicle M as an origin, and is used for control. The position of the object may be represented by a representative point such as a center of gravity or a corner of the object, or may be represented by a represented region. The "state" of the object may include an acceleration, a jerk, or an "action state" of the object (for example, whether the object is changing a lane or is about to change the lane). The object includes another vehicle. That is, the recognition unit 111 includes an other-vehicle recognition unit 111A. The other-vehicle recognition unit 111A recognizes an operation of the other vehicle that travels around the host vehicle M based on an image captured by the camera 11.

Further, the recognition unit 111 recognizes a lane (traveling lane) in which the host vehicle M travels. That is, the recognition unit 111 includes a traveling lane recognition unit 111B. For example, the traveling lane recognition unit 111B recognizes a traveling lane by comparing a pattern of road partition lines obtained from the second map information 62 with a pattern of road partition lines around the host vehicle M recognized from an image captured by the camera 11 or the like. The traveling lane recognition unit 111B may recognize a traveling lane by recognizing traveling boundaries (road boundaries) including the road partition lines, road shoulders, curbstones, a median strip, guard rails, or the like, without being limited to the road partition lines. In the recognition, a position of the host vehicle M acquired from the navigation apparatus 40 or a processing result by the INS may be added. Further, the recognition unit 111 recognizes a temporary stop line, an obstacle, a red light, a toll gate, and other road events.

When recognizing a traveling lane, the recognition unit 111 recognizes a position and a posture of the host vehicle M with respect to the traveling lane. That is, the recognition unit 111 includes a host vehicle recognition unit 111C. For example, the host vehicle recognition unit 111C may recognize a deviation of a representative point of the host vehicle M from a center of a lane and an angle formed with respect to a line that connects the center of the lane in a traveling direction of the host vehicle M as a relative position and a posture of the host vehicle M with respect to the traveling lane.

The recognition unit 111 recognizes a driving state of a driver. That is, the recognition unit 111 includes a driver recognition unit 111D. The driver recognition unit 111D monitors whether the driver grips the steering wheel 51 (hands-on) and whether the driver does not grip the steering wheel 51 (hands-off) based on output information of a contact sensor provided in the steering wheel 51, and monitors whether the driver monitors surroundings of the vehicle (eyes-on) and whether the driver does not monitor the surroundings of the vehicle (eyes-off) based on a direction of a face, a line of sight, and the like of the driver based on output information of an in-vehicle camera.

The recognition unit 111 detects a failure and an abnormality of a device used during automatic driving. That is, the recognition unit 111 includes a failure detection unit 111E. The failure detection unit 111E detects a failure and an abnormality of the detection apparatus 10 such as the camera 11, the radar device 12, and the finder 13. The recognition unit 111 may include a lane departure detection unit that detects a departure of the host vehicle M based on a pattern of road partition lines recognized from an image captured by the camera 11 or the like, together with the failure detection unit 111E or instead of the failure detection unit 111E.

In principle, the action plan generation unit 115 generates a target trajectory along which the host vehicle M travels in the future automatically (without depending on an operation of the driver) such that the host vehicle M travels in a recommended lane determined by the recommended lane determination unit 61 and can cope with a surrounding situation of the host vehicle M. The target trajectory includes, for example, a speed element. For example, the target trajectory is represented by sequentially arranging points (trajectory points) to be reached by the host vehicle M. The trajectory point is a point where the host vehicle M should arrive for each predetermined traveling distance (for example, about several [m]) at a road distance, and separately, a target speed and a target acceleration for each predetermined sampling time (for example, about 0 decimal point [sec]) are generated as a part of the target trajectory. Further, the trajectory point may be a position where the host vehicle M should arrive at a sampling time point for each predetermined sampling time. In this case, information on the target speed and the target acceleration is represented by an interval between the trajectory points.

When generating a target trajectory, the action plan generation unit 115 may set an event of automatic driving. The event of the automatic driving includes a preceding-following event in which the vehicle travels following a preceding vehicle on an expressway, a constant speed traveling event in which the vehicle travels at a predetermined vehicle speed on an expressway, a lane change event, a branching event, a merging event, a takeover event, a vehicle stop event, and the like. The action plan generation unit 115 generates a target trajectory in accordance with an activated event.

The action plan generation unit 115 includes a driving control unit 115A, a collision avoidance control unit 115B, and a driving request unit 115C.

The driving control unit 115A causes the host vehicle M to operate at a different driving control level (hereinafter, referred to as driving level). A high driving level is a driving state in which an automation rate is high. The driving control unit 115A can control at least one of acceleration and deceleration and steering of the host vehicle M based on a recognition result of the recognition unit 111 in addition to a manual driving form in which the driver performs acceleration and deceleration and steering of the host vehicle M. For example, the driving control unit 115A can cause the host vehicle M to operate in the following forms.

The first form is a driving state (hands-on & eyes-on) in which a task of gripping the steering wheel 51 and monitoring surroundings is imposed on the driver. The second form is a driving state (hands-off & eyes-on) where the driving level is higher than that of the first form, and the task of gripping the steering wheel 51 is not imposed on the driver and only the task of monitoring the surroundings is imposed on the driver. The first form and the second form include a driving state where an advanced driver assistance system (ADAS) operates. The ADAS is a driving assistance system represented by an adaptive cruise control system (ACC) or a lane keeping assist system (LKAS). The third form is automatic driving (hands-off & eyes-off) in which the driving level is higher than that of the second form and the task of gripping the steering wheel 51 and the task of monitoring the surroundings are not imposed on the driver. In these examples, the driving level increases in an order of the manual driving state, the first form, the second form, and the third form. Therefore, a change from the third form to the second form and a change from the third form to the manual driving state are examples of a change to the low driving level.

The collision avoidance control unit 115B executes collision avoidance control. In the collision avoidance control, when the host vehicle M determines that there is a possibility of a rear-end collision, the driver is caused to notice the possibility by an alarm and an operation of avoiding the rear-end collision is prompted. The alarm here includes an output of an alarm sound via the speaker 22 and an alarm display via the display 21. Further, in the collision avoidance control, when it is determined that the rear-end collision cannot be avoided, automatic brake may be operated via the brake apparatus 210, or the collision may be avoided by steering.

The driving request unit 115C executes a driving request processing when it is determined that it is difficult to maintain a current driving level based on a surrounding situation during execution of driving control. Although details of the driving request processing will be described later, the driving request processing includes a driving operation request and a driving change request.

The second control unit 120 controls the traveling driving force output apparatus 200, the brake apparatus 210, and the steering apparatus 220 such that the host vehicle M passes through the target trajectory generated by the action plan generation unit 115 at a scheduled time point.

The second control unit 120 includes, for example, an acquisition unit 121, a speed control unit 122, and a steering control unit 123. The acquisition unit 121 acquires information on the target trajectory (trajectory points) generated by the action plan generation unit 115, and stores the acquired information in a memory (not shown). The speed control unit 122 controls the traveling driving force output apparatus 200 or the brake apparatus 210 based on a speed element accompanying the target trajectory stored in the memory. The steering control unit 123 controls the steering apparatus 220 in accordance with a degree of curvature of the target trajectory stored in the memory. Processings of the speed control unit 122 and the steering control unit 123 are implemented by, for example, a combination of feedforward control and feedback control. As an example, the steering control unit 123 executes a combination of feedforward control in accordance with a curvature of a road in front of the host vehicle M and feedback control based on a deviation from the target trajectory. Further, a combination of the driving control unit 115A and the second control unit 120 is an example of the "driving control unit".

Returning to FIG. 1, the traveling driving force output apparatus 200 outputs a traveling driving force (torque) for the vehicle to travel to driving wheels. The traveling driving force output apparatus 200 includes, for example, a combination of an internal combustion engine, an electric motor, a transmission, and the like, and an ECU that controls these components. The ECU controls the above-described configuration in accordance with information input from the second control unit 120 or information input from the driving operator 50.

The brake apparatus 210 includes, for example, a brake caliper, a cylinder that transmits a hydraulic pressure to the brake caliper, an electric motor that causes the cylinder to generate a hydraulic pressure, and a brake ECU. The brake ECU controls the electric motor in accordance with the information input from the second control unit 120 or the information input from the driving operator 50 such that a brake torque in accordance with a braking operation is output to each wheel. The brake apparatus 210 may include, as a backup, a mechanism that transmits a hydraulic pressure generated by an operation of the brake pedal provided in the driving operator 50 to the cylinder via a master cylinder. The brake apparatus 210 is not limited to the configuration described above, and may be an electronically controlled hydraulic pressure brake apparatus that controls an actuator in accordance with the information input from the second control unit 120 and transmits a hydraulic pressure of the master cylinder to the cylinder.

The steering apparatus 220 includes, for example, a steering ECU and an electric motor. The electric motor, for example, changes a direction of steered wheels by applying a force to a rack and pinion mechanism. The steering ECU drives the electric motor in accordance with the information input from the second control unit 120 or the information input from the driving operator 50 to change the direction of the steered wheels.

[Driving Request Processing]

The driving request unit 115C is configured to be able to output a first driving request MDR (Manual Driving Request) and a second driving request MDD (Manual Driving Demand) having a driving operation request level higher than that of the first driving request MDR. The driving request unit 115C has a first mode in which the first driving request MDR is output and the second driving request MDD is output when the first driving request MDR is not satisfied, and a second mode in which the second driving request MDD is output without outputting the first driving request MDR.

A request level of the second driving request MDD is higher than that of the first driving request MDR. The first driving request MDR may be the driving operation request and the second driving request MDD may be the driving change request, or the first driving request MDR may be the driving operation request and the second driving request MDD may be another driving operation request having a request level higher than that of the driving operation request.

When the first driving request MDR is, for example, a task request for requesting the driver to perform a task of monitoring surroundings (eyes-on), the second driving request MDD is, for example, a task request for requesting the driver to perform a task of gripping the steering wheel 51. Further, when the first driving request MDR is, for example, a task request for requesting the driver to perform a task of gripping the steering wheel 51, the second driving request MDD is, for example, a driving change request for requesting the driver to switch from the driving assistance system or the automatic driving to the manual driving.

The first driving request MDR and the second driving request MDD include vibration via the steering wheel 51 and a seat, outputs of an alarm sound or an alarm voice via the speaker 22, an alarm display via the display 21, and the like. The first driving request MDR and the second driving request MDD may be, for example, a beep sound or a buzzer sound as the alarm sound, may be a voice such as "Please check ahead", "Please grasp steering wheel", "Please change driving", or "Please drive by yourself", or may be a picture or a display of text information that prompts a driving operation or a driving change.

The second driving request MDD preferably has an attention calling capability higher than that of the first driving request MDR. The high attention calling capability includes both a fact that the number of notification types is large and a fact that a notification intensity is high. The notification type includes a perception, an auditory sense, and a tactile sense, and the notification intensity includes a color and a size of a notification target when a sense to be applied is the visual sense, and includes a sound pressure, a height of a sound, and a cycle of the sound when a sense to be applied is the auditory sense. For example, specifically describing a case where the notification type is the sound or the voice as an example, it is preferable that the second driving request MDD has a volume higher than that of the first driving request MDR or has a cycle of the beep sound or the like shorter than that of the first driving request MDR.

An output time of the second driving request MDD is preferably different from an output time of the first driving request MDR. The output time of the second driving request MDD may be longer than the output time of the first driving request MDR, and the output time of the second driving request MDD may be shorter than the output time of the first driving request MDR. Since the output time of the second driving request MDD is longer than the output time of the first driving request MDR, it is possible to request the driver to perform a driving request for a longer time w % ben urgency is high. On the contrary, by making the output time of the second driving request MDD shorter than the output time of the first driving request MDR, an attention calling function is prevented from deteriorating.

The first mode is selected when the urgency is not high, and the first driving request MDR and the second driving request MDD are sequentially output to prompt the driver to perform a driving operation. The second mode is selected in a case where urgency is high, such as a case where an event in which behavior of the host vehicle M rapidly changes occurs, a case where an abnormality such as a failure or functional deterioration of the camera 11, the radar device 12, or the finder 13 occurs, and only the second driving request MDD is output to prompt a quick driving operation.

Figure 4:
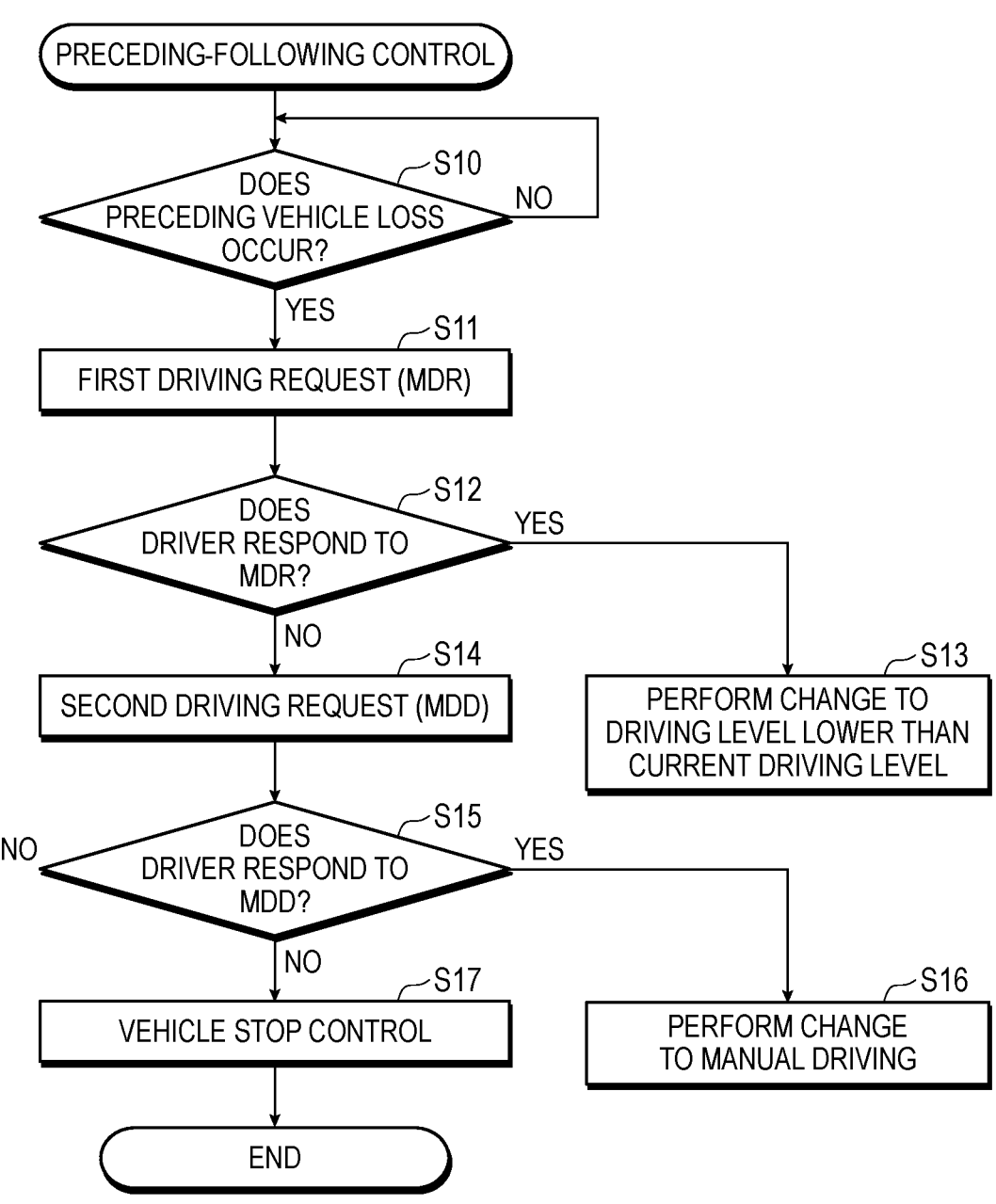
FIG. 4 is a flowchart of the driving request processing in FIG. 3.

FIG. 3 is a diagram showing an example of a situation in which a driving request processing in the first mode is performed. FIG. 4 is a flowchart of the driving request processing in FIG. 3. Roads shown in FIGS. 3 and 5 indicate an expressway with two lanes on each side on which it is determined that an automobile travels on a left side, and oncoming lanes are not shown. A first lane L1 is a traveling lane, and a second lane L2 is an overtaking lane located on an oncoming lane side with respect to the first lane L1. In the following description, a state where the automatic driving of the third form described above is performed as driving control will be described as an example. However, the present invention is not limited thereto, and may be, for example, a state where the driving control of the second form is performed.

During execution of a preceding-following event in which the host vehicle M travels following the preceding vehicle CA on an expressway in the automatic driving of the third form, when a preceding vehicle is lost (hereinafter, referred to as preceding vehicle loss) such as when a preceding vehicle CA changes a lane to the second lane L2 or when the preceding vehicle CA is not accelerated, the host vehicle M cannot continue the preceding-following event at a current driving level. Therefore, the other-vehicle recognition unit 111A monitors whether the preceding vehicle loss occurs (S10). When the preceding vehicle loss does not occur (NO in S10), the preceding-following event continues, and the other-vehicle recognition unit 111A repeats the processing of step S10 in a predetermined cycle. When the preceding vehicle loss occurs (YES in S10), the driving request unit 115C performs the driving request processing in the first mode.

When recognizing that the preceding vehicle is lost, the driving request unit 115C first performs the first driving request MDR (S11). More specifically, the driving request unit 115C outputs "beep . . . beep . . . and beep" and an alarm sound via the speaker 22, and requests the driver to perform, for example, a task of monitoring surroundings (eyes-on). Further, when the driver does not grasp the steering wheel, the driving request unit 115C may request a steering wheel operation, or may request the steering wheel operation and acceleration and deceleration control. Next, the driving request unit 115C determines whether the driver responds to the first driving request MDR (S12).

When the driver responds to the first driving request MDR (YES in S12), that is, when the driver recognition unit 111D recognizes that the driver monitors surroundings of the vehicle (eyes-on) based on the direction of the face, the line of sight, or the like of the driver in response to the request of the task of monitoring the surroundings (eyes-on), the driving control unit 115A changes a driving level to a driving level lower than a current driving level (S13). The driving level lower than the current driving level may be, for example, a driving level (the driving control of the second form) for imposing a task of monitoring surroundings on the driver, a driving level for imposing a task of the steering wheel operation on the driver, or a driving level for imposing a task of the steering wheel operation and the acceleration and deceleration control on the driver.

When the driver does not respond to the first driving request MDR (NO in S12), the driving request unit 115C subsequently performs the second driving request MDD after a predetermined time has elapsed since the output of the first driving request MDR (S14). More specifically, the driving request unit 115C outputs an alarm sound having a higher attention calling capability such as "beep, beep, and beep" via the speaker 22, and performs an alarm display of "Please change driving" on, for example, the display 21. The driving request unit 115C determines whether the driver responds to the second driving request MDD (S15). When the driver responds to the second driving request MDD (YES in S15), that is, when the driver recognition unit 111D recognizes that the driver monitors the surroundings of the vehicle (eyes-on) and recognizes that the driver grips the steering wheel 51 (hands-on), the driving control unit 115A changes the driving control to the manual driving (S16).

When the driver does not respond to the second driving request MDD (NO in S15), the driving control unit 115A performs vehicle stop control for stopping the host vehicle M (S17). Although details of the vehicle stop control are omitted, the driving control unit 115A searches for a vehicle stop space such as a road shoulder and determines a vehicle stop position. When there is no vehicle stop position, the host vehicle M may stop on the traveling lane.

In this way, in the first mode, by changing a driving level depending on a case where the driver responds to the first driving request MDR and a case where the driver responds to the second driving request MDD, that is, by changing the driving level after the driving request is satisfied in accordance with a difference in urgency, the driving assistance can be safely continued after the first driving request MDR.

Figure 5:
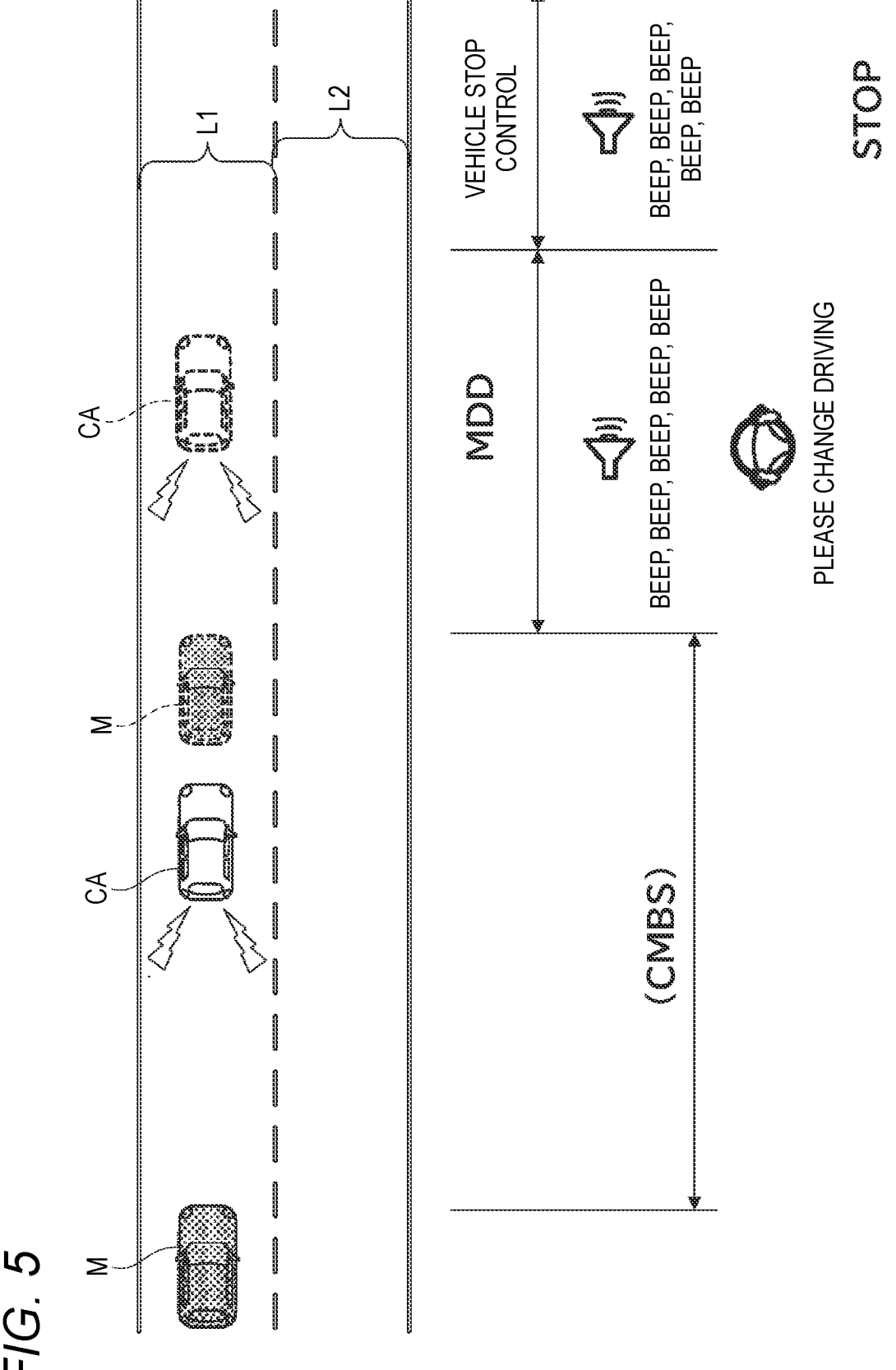
FIG. 5 is a diagram showing an example of a situation in which a driving request processing in a second mode is performed.
Figure 6:
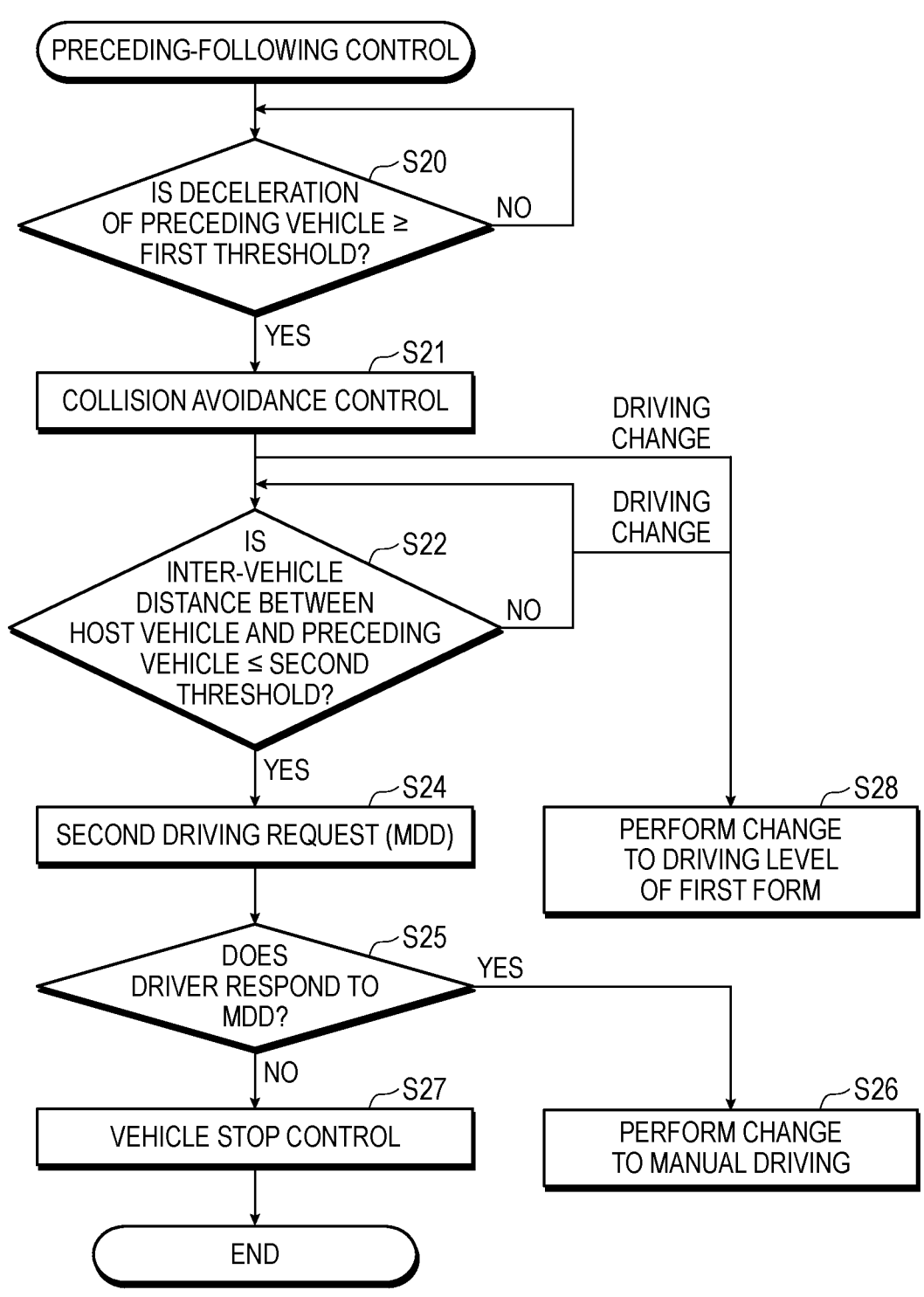
FIG. 6 is a flowchart of the driving request processing in FIG. 5.

FIG. 5 is a diagram showing an example of a situation in which the driving request processing in the second mode is performed. FIG. 6 is a flowchart of the driving request processing in FIG. 5.

During execution of a preceding-following event in which the host vehicle M travels following the preceding vehicle CA on an expressway in the automatic driving of the third form, when the preceding vehicle CA suddenly brakes, the host vehicle M may not be able to continue the preceding-following event at a current driving level. Therefore, the other-vehicle recognition unit 111A monitors whether a deceleration of the preceding vehicle is equal to or larger than a first threshold (S20). When the deceleration of the preceding vehicle is less than the first threshold (NO in S20), the other-vehicle recognition unit 111A continues the preceding-following event, and the other-vehicle recognition unit 111A repeats the processing of step S20 in a predetermined cycle. When the deceleration of the preceding vehicle is equal to or larger than the first threshold (YES in S20), the collision avoidance control unit 115B executes the collision avoidance control (S21). In FIG. 5, CMBS stands for Collision Mitigation Brake System.

Next, the other-vehicle recognition unit 111A determines whether an inter-vehicle distance between the host vehicle M and the preceding vehicle is equal to or smaller than a second threshold (S22). When the inter-vehicle distance between the host vehicle M and the preceding vehicle CA is equal to or smaller than the second threshold despite the collision avoidance control (YES in S22), the driving request unit 115C performs the driving request processing in the second mode. When the inter-vehicle distance between the host vehicle M and the preceding vehicle CA is larger than the second threshold, the other-vehicle recognition unit 111A continues the preceding-following event and repeats the processing of step S22 until a predetermined condition is satisfied. When the driver changes driving during the collision avoidance control, the driving control unit 115A changes a driving level to the driving level of the first form at which a task of gripping the steering wheel 51 and monitoring the surroundings is imposed on the driver (S28).

When the inter-vehicle distance between the host vehicle M and the preceding vehicle CA is equal to or smaller than the second threshold (YES in S22), the driving request unit 115C performs the second driving request MDD (S24). More specifically, the driving request unit 115C outputs an alarm sound having a high attention calling capability, such as "beep, beep, and beep" via the speaker 22, and performs an alarm display of "Please change driving" on, for example, the display 21. The driving request unit 115C determines whether the driver responds to the second driving request MDD (S25). When the driver responds to the second driving request MDD (YES in S25), that is, when the driver recognition unit 111D recognizes that the driver monitors the surroundings of the vehicle (eyes-on) based on the direction of the face, the line of sight, or the like of the driver and recognizes that the driver grips the steering wheel 51 (hands-on), the driving control unit 115A changes the driving control to the manual driving (S26).

When the driver does not respond to the second driving request MDD (NO in S25), the driving control unit 115A performs the vehicle stop control for stopping the host vehicle M (S27).

When the host vehicle M is excessively close to the preceding vehicle CA, the driving operation cannot be requested in time with a margin. Therefore, the driver can be appropriately notified of the urgency by outputting only the second driving request MDD having a high request level. In this example, the display of the collision avoidance control, for example, an alarm sound, an alarm voice, an alarm display, or the like is performed by the operation of the collision avoidance control. Therefore, even when the second driving request MDD is issued to the driver, a sudden feeling is prevented. In the above-described embodiment, the second driving request MDD is performed when both of the case where the deceleration of the preceding vehicle is equal to or larger than the first threshold and the case where the inter-vehicle distance between the host vehicle M and the preceding vehicle is equal to or smaller than the second threshold are satisfied, and the second driving request MDD may be performed when only one of the cases is satisfied.

Figure 8:
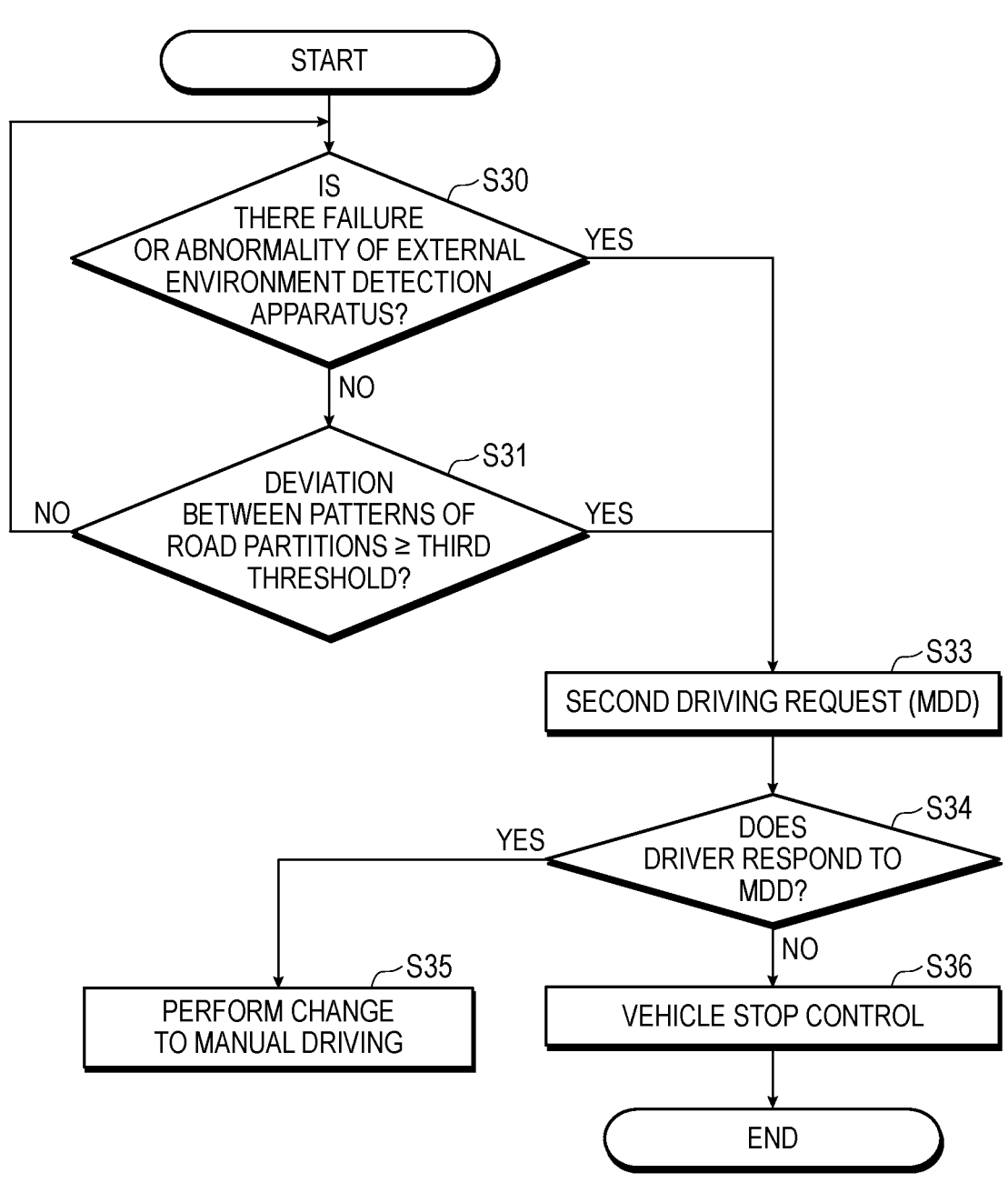
FIG. 8 is a flowchart of the driving request processing in FIG. 7.

FIG. 7 is a diagram showing another example of a situation in which the driving request processing in the second mode is performed. FIG. 8 is a flowchart of the driving request processing in FIG. 7.

In a case where the host vehicle M travels on the premise that the pattern of the road partition lines around the host vehicle M recognized from the image captured by the camera 11 or the like matches the pattern of the road partition lines obtained from the second map information 62, when the failure detection unit 111E detects a failure or an abnormality of the detection apparatus 10 such as the camera 11, the radar device 12, and the finder 13 in the automatic driving of the third form, or when the traveling lane recognition unit 111B determines that the pattern of the road partition lines obtained from the second map information 62 and the pattern of the road partition lines around the host vehicle M recognized from the image captured by the camera 11 or the like deviate from each other by a predetermined amount or more, or when a departure of the host vehicle M is predicted based on the pattern of the road partition lines recognized from the image captured by the camera 11 or the like, the host vehicle M cannot continue the automatic driving at a current driving level.

Therefore, the failure detection unit 111E monitors whether there is a failure or an abnormality in the detection apparatus 10 (S30). When the failure or the abnormality of the detection apparatus 10 is not detected (NO in S30), that is, when there is no failure or the like of the detection apparatus 10, the traveling lane recognition unit 111B determines whether a deviation between the pattern of the road partition lines obtained from the second map information 62 and the pattern of the road partition lines around the host vehicle M recognized from the image captured by the camera 11 or the like is equal to or larger than a third threshold (S31). When the deviation of the pattern of the road partition lines is less than the third threshold, the processings of steps S30 and S31 are repeated.

In FIG. 7, a lane indicated by solid lines indicates a portion where there is no deviation between a pattern of road partition lines obtained from the second map information 62 and a pattern of road partition lines around the host vehicle M recognized from an image captured by the camera 11 or the like, a lane indicated by dotted lines indicates a pattern of road partition lines obtained from the second map information 62, a lane indicated by one-dot chain lines indicates a pattern of road partition lines around the host vehicle M recognized from an image captured by the camera 11 or the like, and a situation in which a deviation of the pattern of the road partition lines occurs in the portions indicated by the dotted lines and the one-dot chain lines is shown. Such a deviation of the pattern of the road partition lines may occur due to a shadow of an entrance of a tunnel, a shadow of a bridge, or the like, in addition to the failure or the abnormality of the detection apparatus 10. In steps S30 and S31, the lane departure detection unit may predict the departure of the host vehicle M based on the pattern of the road partition lines recognized from the image captured by the camera 11 or the like.

When the failure or the abnormality of the detection apparatus 10 is detected (YES in S30), or when the deviation of the pattern of the road partition lines is equal to or larger than the third threshold (YES in S31), the driving request unit 115C performs the second driving request MDD (S33). At this time, the action plan generation unit 115 generates a target trajectory based on the second map information 62.

Since the action plan generation unit 115 generates the target trajectory based on the second map information 62, the automatic driving can be continued for a predetermined period. The driving request unit 115C outputs an alarm sound having a high attention calling capability such as "beep, beep, and beep" via the speaker 22, and performs an alarm display of "Please change driving" on the display 21. The driving request unit 115C determines whether the driver responds to the second driving request MDD (S34). When the driver responds to the second driving request MDD (YES in S34), that is, when the driver recognition unit 111D recognizes that the driver monitors the surroundings of the vehicle (eyes-on) based on the direction of the face, the line of sight, or the like of the driver and recognizes that the driver grips the steering wheel 51 (hands-on), the driving control unit 115A changes the driving control to the manual driving (S35).

When the driver does not respond to the second driving request MDD (NO in S34), the driving control unit 115A performs the vehicle stop control for stopping the host vehicle M (S36).

Although the embodiment is described above with reference to the drawings, it is needless to say that the present invention is not limited to such an example. It is apparent to those skilled in the art that various changes and modifications can be conceived within the scope of the claims, and it is also understood that the various changes and modifications belong to the technical scope of the present invention. Components in the embodiment described above may be combined freely within a range not departing from the spirit of the invention.

The present specification describes at least the following matters. Although the corresponding components or the like in the above-described embodiment are shown in parentheses, the present invention is not limited thereto.

(1) A vehicle control apparatus (the automatic driving control apparatus 100) including:

a recognition unit (the recognition unit 111) configured to recognize a surrounding situation of a host vehicle (the vehicle M);

a driving control unit (the driving control unit 115A and the second control unit 120) configured to control at least one of acceleration and deceleration and steering of the host vehicle based on a recognition result of the recognition unit and to perform driving control of the host vehicle; and a driving request unit (the driving request unit 115C) configured to execute a driving change request or a driving operation request based on the surrounding situation during execution of the driving control, in which the driving request unit is configured to output a first request (the first driving request MDR) and a second request (the second driving request MDD) different from the first request, and in which the driving request unit includes a first mode in which the first request is output, and the second request is output when the first request is not satisfied, and a second mode in which the second request is output without outputting the first request.

According to (1), when the urgency is not high, it is possible to sequentially output the two different requests to prompt the driving operation, and when the urgency is high, it is possible to output only the second request to prompt the quick driving operation.

(2) The vehicle control apparatus according to (1), in which the second request has a request level higher than that of the first request.

According to (2), it is possible to appropriately notify the driver of the urgency by changing the request level.

(3) The vehicle control apparatus according to (2), in which the driving request unit sets an output time for outputting the second request to be longer than an output time for outputting the first request.

According to (3), when the urgency is high, it is possible to request the driver to perform a driving request for a longer time.

(4) The vehicle control apparatus according to (2), in which the driving request unit sets an output time for outputting the second request to be shorter than an output time for outputting the first request.

According to (4), it is possible to prevent the second request having a high request level from being output for a long time.

(5) The vehicle control apparatus according to any one of (1) to (4), in which when a deceleration of a preceding vehicle is equal to or larger than a first threshold, the driving request unit executes the second mode.

According to (5), when the preceding vehicle suddenly brakes, the driving operation cannot be requested in time with a margin. Therefore, the driver can be appropriately notified of the urgency by outputting only the second request having a high request level. Further, when the preceding vehicle suddenly brakes during driving control, other control such as collision avoidance brake intervenes, so that a display of other control replaces the first request, and the sudden feeling to the driver is prevented.

(6) The vehicle control apparatus according to any one of (1) to (4), in which when an inter-vehicle distance between the host vehicle and a preceding vehicle is equal to or smaller than a second threshold, the driving request unit executes the second mode.

According to (6), when the host vehicle is excessively close to the preceding vehicle, the driving operation cannot be requested in time with a margin. Therefore, the driver can be appropriately notified of the urgency by outputting only the second request having a high request level. Further, when the host vehicle is excessively close to the preceding vehicle during the driving control, other control such as collision avoidance brake intervenes, so that a display of other control replaces the first request, and the sudden feeling to the driver is prevented.

(7) The vehicle control apparatus according to any one of (1) to (4), in which the driving request unit compares map information with the surrounding situation acquired from an external environment detection apparatus, and executes the second mode when the map information does not match the surrounding situation.

According to (7), for example, when a recognized white line of a host vehicle traveling lane and the map information are unmatched with each other, the driver can be appropriately notified of the urgency by outputting the second request.

(8) The vehicle control apparatus according to any one of (1) to (4), further including:

a failure detection unit (the failure detection unit 111E) configured to detect a failure or an abnormality of an external environment detection apparatus, in which when a failure or an abnormality of the external environment detection apparatus is detected, the driving request unit executes the second mode.

According to (8), when a failure or an abnormality such as performance deterioration occurs in the external environment detection apparatus, the driver can be appropriately notified of the urgency by outputting the second request.

(9) The vehicle control apparatus according to any one of (1) to (4), further including:

a lane departure detection unit configured to detect a departure of the host vehicle from a lane, in which when the departure is predicted, the driving request unit executes the second mode.

According to (9), the driver can be appropriately notified of the urgency by predicting the departure from the lane that may occur due to a failure, performance deterioration, or the like of the external environment detection apparatus, and outputting the second request.

(10) The vehicle control apparatus according to any one of (7) to (9), in which when outputting the second request, the driving control is continued based on map information (the second map information 62).

According to (10), it is possible to appropriately perform the driving assistance by continuing traveling based on the map information.

(11) The vehicle control apparatus according to any one of (1) to (10), in which when the second request is not satisfied after the second request is output, the host vehicle is stopped.

According to (11), when the driver does not respond to the second request, it is possible to secure safety by stopping the host vehicle.

(12) The vehicle control apparatus according to any one of (1) to (11), in which the driving control unit is configured to change a driving level that is a level of the driving control, and in which when the first request is satisfied or the second request is satisfied, the driving level is changed from a current driving level to a low driving level.

According to (12), the driving assistance can be continued when the driver responds to the driving request.

(13) The vehicle control apparatus according to any one of (1) to (11), in which the driving control unit is configured to change a driving level that is a level of the driving control, and in which the driving level is changed when the first request is satisfied after the first request is output and when the second request is satisfied after the second request is output.

According to (13), the driving assistance can be safely continued by changing the driving level after the driving request is satisfied in accordance with a difference in urgency.

(14) The vehicle control apparatus according to (13), in which when the first request is satisfied after the first request is output, the driving control unit changes the driving level to a driving level lower than a current driving level, and in which when the second request is satisfied after the second request is output, the driving control unit switches driving from automatic driving to manual driving.

According to (14), the driving assistance can be continued when the first request is satisfied after the first request is output, and driving can be continued without stopping the host vehicle by switching driving to the manual driving when the second request is satisfied after the second request is output.

(15) The vehicle control apparatus according to any one of (1) to (14), in which the first request is a driving operation request, and in which the second request is a driving change request.

According to (15), it is possible to lower the driving level by causing the driver to perform the driving operation in response to the first request, and it is possible to switch driving to the manual driving by causing the driver to perform the driving change in response to the second request.

(16) The vehicle control apparatus according to any one of (1) to (14), in which the first request is a driving operation request, and in which the second request is another driving operation request having a request level higher than that of the driving operation request.

According to (16), it is possible to set a driving level in accordance with a situation by requesting different driving operations in accordance with urgency.

What is claimed is:

1. A vehicle control apparatus comprising:

a recognition unit configured to recognize a surrounding situation of a host vehicle;

a driving control unit configured to control at least one of acceleration and deceleration and steering of the host vehicle based on a recognition result of the recognition unit and to perform driving control of the host vehicle; and a driving request unit configured to execute a driving change request or a driving operation request based on the surrounding situation during execution of the driving control, wherein the driving control includes the host vehicle operating at a first driving state in which a task of an occupant gripping a steering operation unit is reduced or a second driving state in which a task of the occupant monitoring surroundings is reduced, the driving request unit is configured to output a first request and a second request different from the first request, the driving request unit comprises a first mode in which the first request is output, and the second request is output when a state of action of the occupant does not satisfy the first request, and a second mode in which the second request is output without outputting the first request when a state of action of the host vehicle satisfies a predetermined condition, the second request is a request for a task of the occupant driving manually when the first request is the request for the task of the occupant gripping the steering operation unit, the driving control unit is configured to change a driving level that is a level of the driving control, in the first mode, a request for the task of the occupant monitoring surroundings is output to the occupant as the first request and a request for manual driving in which the occupant performs acceleration and deceleration and steering of the host vehicle without assistance is output to the occupant as the second request, when the driving control is in the first driving state, and a request for the task of the occupant gripping the steering operation unit is output to the occupant as the first request and a request for the manual driving is output to the occupant as the second request, when the driving control is in the second driving state, in the second mode, a request for the manual driving is output to the occupant as the second request, when the driving control is in the first driving state and the second driving state, and the recognition unit, the driving control unit, and the driving request unit are each implemented via at least one processor.

2. The vehicle control apparatus according to claim 1, wherein the second request has a request level higher than that of the first request.

3. The vehicle control apparatus according to claim 2, wherein the driving request unit sets an output time for outputting the second request to be longer than an output time for outputting the first request.

4. The vehicle control apparatus according to claim 2, wherein the driving request unit sets an output time for outputting the second request to be shorter than an output time for outputting the first request.

5. The vehicle control apparatus according to claim 1, wherein when a deceleration of a preceding vehicle is equal to or larger than a first threshold, the driving request unit executes the second mode.

6. The vehicle control apparatus according to claim 1, wherein when an inter-vehicle distance between the host vehicle and a preceding vehicle is equal to or smaller than a second threshold, the driving request unit executes the second mode.

7. The vehicle control apparatus according to claim 1, wherein the driving request unit compares map information with the surrounding situation acquired from an external environment detection apparatus, and executes the second mode when the map information does not match the surrounding situation.

8. The vehicle control apparatus according to claim 1, further comprising:

a failure detection unit configured to detect a failure or an abnormality of an external environment detection apparatus, wherein when a failure or an abnormality of the external environment detection apparatus is detected, the driving request unit executes the second mode, and wherein the failure detection unit is implemented via at least one processor.

9. The vehicle control apparatus according to claim 1, further comprising:

a lane departure detection unit configured to detect a departure of the host vehicle from a lane, wherein when the departure is predicted, the driving request unit executes the second mode, and wherein the lane departure detection unit is implemented via at least one processor.

10. The vehicle control apparatus according to claim 7, wherein when outputting the second request, the driving control is continued based on map information.

11. The vehicle control apparatus according to claim 1, wherein when the second request is not satisfied after the second request is output, the host vehicle is stopped.

12. The vehicle control apparatus according to claim 1, wherein the driving control unit is configured to change a driving level that is a level of the driving control, and wherein when the first request is satisfied or the second request is satisfied, the driving level is changed from a current driving level to a low driving level.

13. The vehicle control apparatus according to claim 1, wherein the driving level is changed when the first request is satisfied after the first request is output and when the second request is satisfied after the second request is output.

14. The vehicle control apparatus according to claim 1, wherein the first request is a driving operation request, and wherein the second request is a driving change request.

15. The vehicle control apparatus according to claim 1, wherein the first request is a driving operation request, and wherein the second request is another driving operation request having a request level higher than that of the driving operation request.

16. The vehicle control apparatus according to claim 1, wherein the driving control unit is configured to select one of the first mode and the second mode depending on urgency, the urgency being whether a function of the host vehicle deteriorates.

17. A vehicle control apparatus comprising:

a recognition unit configured to recognize a surrounding situation of a host vehicle;

a driving control unit configured to control at least one of acceleration and deceleration and steering of the host vehicle based on a recognition result of the recognition unit and to perform driving control of the host vehicle; and a driving request unit configured to execute a driving change request or a driving operation request based on the surrounding situation during execution of the driving control, wherein the driving control includes the host vehicle operating at a first driving state in which a task of an occupant gripping a steering operation unit is reduced or a second driving state in which a task of the occupant monitoring surroundings is reduced, the driving request unit is configured to output a first request and a second request different from the first request, the driving request unit comprises a first mode in which the first request is output, and the second request is output when a state of action of the occupant does not satisfy the first request, and a second mode in which the second request is output without outputting the first request when a state of action of the host vehicle satisfies a predetermined condition, the second request is a request for a task of the occupant driving manually when the first request is the request for the task of the occupant gripping the steering operation unit, the driving control unit is configured to change a driving
   level that is a level of the driving control,
in the first mode,
   a request for the task of the occupant gripping the
      steering operation unit is output to the occupant as
      the first request and a request for manual driving in
      which the occupant performs acceleration and decel-
      eration and steering of the host vehicle without
      assistance is output to the occupant as the second
      request, when the driving control is in the first
      driving state, and
   a request for the task of the occupant gripping the
      steering operation unit is output to the occupant as
      the first request and a request for the manual driving
      is output to the occupant as the second request, when
      the driving control is in the second driving state,
in the second mode,
   a request for the manual driving is output to the
      occupant as the second request, when the driving
      control is in the first driving state and the second
      driving state, and
the recognition unit, the driving control unit, and the
   driving request unit are each implemented via at least
   one processor.

\*   \*   \*   \*   \*